(12) United States Patent
Qi et al.

(10) Patent No.: US 12,187,375 B2
(45) Date of Patent: Jan. 7, 2025

(54) FRAME AND MOBILITY SCOOTER

(71) Applicant: Ninebot (Changzhou) Tech Co., Ltd., Jiangsu (CN)

(72) Inventors: Zefang Qi, Jiangsu (CN); Hui Su, Jiangsu (CN)

(73) Assignee: Ninebot (Changzhou) Tech Co., Ltd., Jiangsu (CN)

( * ) Notice: Subject to any disclaimer, the term of this patent is extended or adjusted under 35 U.S.C. 154(b) by 425 days.

(21) Appl. No.: 17/583,824

(22) Filed: Jan. 25, 2022

(65) Prior Publication Data

US 2022/0234674 A1  Jul. 28, 2022

(30) Foreign Application Priority Data

Jan. 27, 2021  (CN) .......................... 202120238048.1

(51) Int. Cl.
    *B62K 19/32*  (2006.01)
(52) U.S. Cl.
    CPC .................................. *B62K 19/32* (2013.01)
(58) Field of Classification Search
    CPC ........ B62K 17/00; B62K 11/10; B62K 19/06; B62K 19/30; B62K 3/002; B62K 19/32
    USPC .......................................................... 280/63
    See application file for complete search history.

(56) References Cited

U.S. PATENT DOCUMENTS

| | | | |
|---|---|---|---|
| 2020/0398694 A1 | 12/2020 | Treadway et al. | |
| 2022/0234674 A1* | 7/2022 | Qi ........................... | B62J 43/00 |

FOREIGN PATENT DOCUMENTS

| | | | | |
|---|---|---|---|---|
| CN | 203473137 U | 3/2014 | | |
| CN | 104210592 B | 8/2016 | | |
| CN | 209479867 U | 10/2019 | | |
| CN | 209535333 U | 10/2019 | | |
| CN | 210338181 U | 4/2020 | | |
| CN | 210592288 U | 5/2020 | | |
| EP | 1000845 A2 * | 5/2000 | ............. | B62K 17/00 |

OTHER PUBLICATIONS

Extended European Search Report dated Jun. 22, 2022 for corresponding European Application No. 22151315.3.
Extended European Search Report dated Jun. 28, 2022 for corresponding European Application No. 22152058.8.

* cited by examiner

*Primary Examiner* — James A Shriver, II
*Assistant Examiner* — Hilary L Johns
(74) *Attorney, Agent, or Firm* — David D. Brush; Westman, Champlin & Koehler, P.A.

(57) ABSTRACT

A frame and a mobility scooter. The frame includes a first longitudinal beam, a second longitudinal beam, a head tube and a first cross beam. A first end of the first longitudinal beam and a first end of the second longitudinal beams are both coupled to the head tube. The first cross beam has a first end coupled to the first longitudinal beam and a second end coupled to the second longitudinal beam. The first longitudinal beam is divided into a first front tube section and a first rear tube section by the first cross beam, the second longitudinal beam is divided into a second front tube section and a second rear tube section by the first cross beam, and the first and second rear tube sections form a rear fork of the mobility scooter.

18 Claims, 2 Drawing Sheets

FRAME AND MOBILITY SCOOTER

CROSS-REFERENCE TO RELATED APPLICATION

This application claims priority to and benefits of Chinese Patent Application Serial No. 202120238048.1, filed with National Intellectual Property Administration of PRC on Jan. 27, 2021, the entire content of which is incorporated herein by reference.

FIELD

The present disclosure relates to a field of frames, and particularly to a frame and a mobility scooter.

BACKGROUND

In the related art, generally, a rear fork of an electric scooter is coupled to a cross beam on a frame by means of bolts or welding, and the arrangement easily results in low assembly efficiency of the electric scooter as well as low strength and poor precision of coupling between the frame and the rear fork.

SUMMARY

A frame according to the embodiments of the present disclosure includes a first longitudinal beam, a second longitudinal beam, a head tube and a first cross beam. A first end of the first longitudinal beam and a first end of the second longitudinal beams are both coupled to the head tube. The first cross beam has a first end coupled to the first longitudinal beam and a second end coupled to the second longitudinal beam. The first longitudinal beam is divided into a first front tube section and a first rear tube section by the first cross beam, the second longitudinal beam is divided into a second front tube section and a second rear tube section by the first cross beam, and the first and second rear tube sections form a rear fork of the mobility scooter.

A mobility scooter according to embodiments of a second aspect of the present disclosure includes a frame and a rear wheel. The fame includes a first longitudinal beam, a second longitudinal beam, a head tube and a first cross beam. A first end of the first longitudinal beam and a first end of the second longitudinal beams are both coupled to the head tube. The first cross beam has a first end coupled to the first longitudinal beam and a second end coupled to the second longitudinal beam. The first longitudinal beam is divided into a first front tube section and a first rear tube section by the first cross beam, the second longitudinal beam is divided into a second front tube section and a second rear tube section by the first cross beam, and the first and second rear tube sections form a rear fork of the mobility scooter. The rear wheel is mounted to the frame through the first and the second rear tube sections.

DETAILED DESCRIPTION

Figure 1:
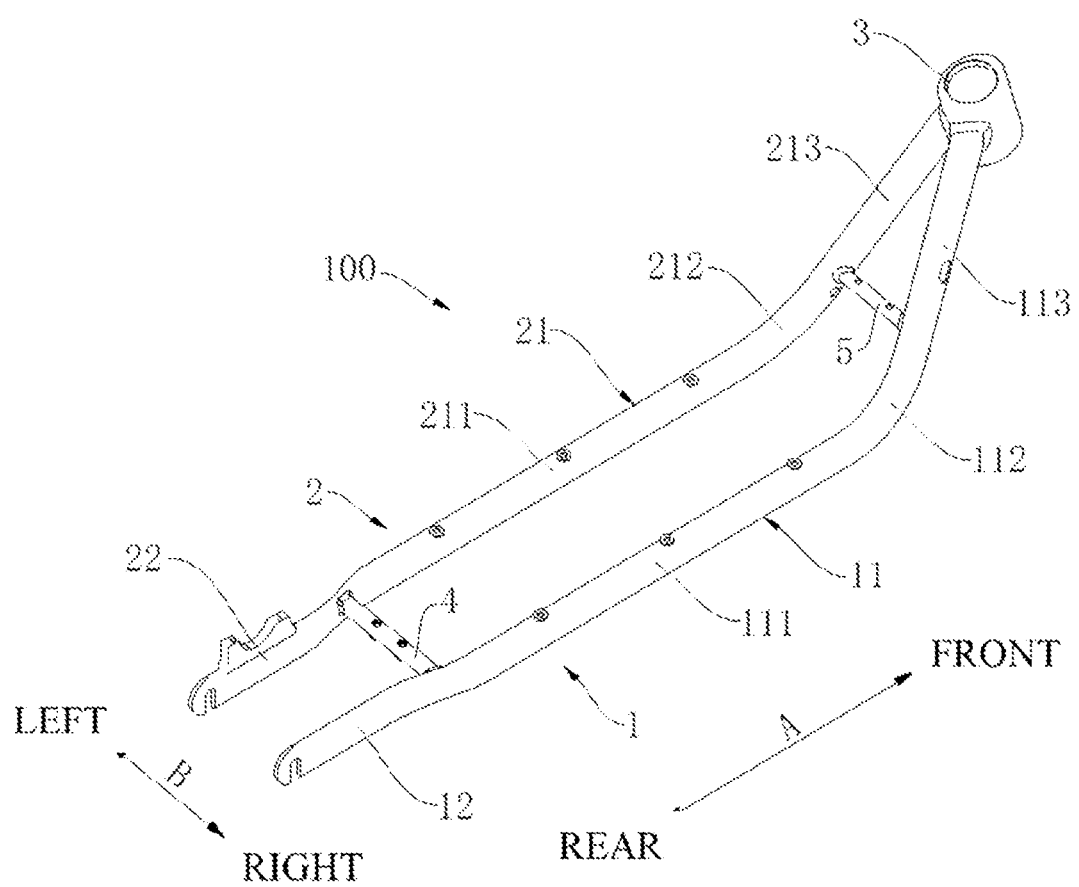
FIG. 1 is a schematic diagram of a frame according to an embodiment of the present disclosure.

Reference will be made in detail to embodiments of the present disclosure, and the examples of the embodiments are illustrated in the drawings. The embodiments described herein with reference to drawings are illustrative, and intended to explain the present disclosure. The embodiments shall not be construed to limit the present disclosure.

A frame 100 according to embodiments of the present disclosure is described below with reference to FIG. 1.

The frame 100 according to the embodiments of the present disclosure includes a first longitudinal beam 1, a second longitudinal beam 2, a head tube 3 and a first cross beam 4. A first end of the first longitudinal beams 1 and a first end of the second longitudinal beams 2 are both coupled to the head tube 3. The first cross beam 4 has a first end coupled to the first longitudinal beam 1 and a second end coupled to the second longitudinal beam 2. The first longitudinal beam 1 is divided into a first front tube section 11 and a first rear tube section 12 by the first cross beam 4, the second longitudinal beam 2 is divided into a second front tube section 21 and a second rear tube section 22 by the first cross beam 4, and the first and second rear tube sections 12, 22 form a rear fork of a mobility scooter.

In the frame 100 according to the embodiments of the present disclosure, the first and second rear tube sections 12, 22 in the first and second longitudinal beams 1, 2 are arranged to form the rear fork of the mobility scooter; that is, a rear wheel of the mobility scooter may be directly mounted to the frame 100, thereby omitting an assembly step of the rear fork during assembly of the mobility scooter, and achieving high assembly efficiency of the mobility scooter. Moreover, the first and second rear tube sections 12, 22 forming the rear fork in the frame 100 are integrally formed with the first and second front tube sections 11, 21 respectively, such that the frame 100 has high manufacturing precision and reliable strength.

For easy understanding, an arrow A in FIG. 1 shows a front-rear direction of the frame 100 according to the embodiments of the present disclosure, and an arrow B in FIG. 1 shows a left-right direction of the frame 100 according to the embodiments of the present disclosure.

In some embodiments, the first and second longitudinal beams 1, 2 are each a bent tube.

In at least one embodiment, the first and second longitudinal beams 1, 2 are each formed by bending a standard tube. The standard tube may also be referred to as a national standard steel tube, which is produced by piercing a steel ingot or a solid tube blank into a shell, and then undergoing hot rolling, cold rolling or cold drawing operations. The first and second longitudinal beams 1, 2 thus produced have high strength.

In some embodiments, the first front tube section 11 includes a first horizontal tube section 111, a first bent tube section 112 and a first inclined tube section 113 arranged sequentially, and the second front tube section 21 includes a second horizontal tube section 211, a second bent tube section 212 and a second inclined tube section 213 arranged sequentially. The first and second horizontal tube sections 111, 211 are parallel to each other, and the first and second inclined tube sections 113, 213 form an angle and are both coupled to the head tube 3. Thus, the first and second horizontal tube sections 111, 211 serve as a main support for receiving a battery compartment assembly of a scooter.

As illustrated in FIG. 1, the first and second horizontal tube sections 111, 211 as well as the first and second inclined tube sections 113, 213 are each a straight tube, the first and second horizontal tube sections 111, 211 both extend in the front-rear direction, the first inclined tube section 113 extends upwards to the front left relative to the first horizontal tube section 111, and the second inclined tube section 213 extends upwards to the front right relative to the second horizontal tube section 211. An upper end of the first inclined tube section 113 and an upper end of the second inclined tube section 213 are close to each other in the left-right direction and are fixedly welded to an outer side wall of the head tube 3.

In some embodiments, the frame 100 further includes a second cross beam 5, and the second cross beam couples the first and second inclined tube sections 113, 213.

Thus, the first and second cross beams 4, 5 as well as the head tube 3 jointly realize the coupling of the first and second longitudinal beams 1, 2, and the first and second longitudinal beams 1, 2 in the frame 100 have higher and more reliable coupling strength.

In some embodiments, the first cross beam 4 has a first end welded to an inner side of the first longitudinal beam 1 and a second end welded to an inner side of the second longitudinal beam 2.

By welding the first and second cross beams 4, 5 between the first and second longitudinal beams 1, 2, the first and second cross beams 4, 5 and the first and second longitudinal beams 1, 2 have coupling positions easier to confirm, and the frame 100 has higher manufacturing precision.

In at least one embodiment, the first and second cross beams 4, 5 are coupled to the first and second longitudinal beams 1, 2 with a carbon-dioxide arc welding operation. As illustrated in FIG. 1, on a projection plane perpendicular to the left-right direction, projections of the first and second cross beams 4, 5 coincide with a projection of the first longitudinal beam 1; that is, the first and second cross beams 4, 5 are hidden between the first and second longitudinal beams 1, 2. Thus, the frame 100 has a compact structure and a higher aesthetic appearance.

In some embodiments, as illustrated in FIG. 1, the first and second cross beams 4, 5 are both made of round tubes which are standard steel tubes. Thus, the first and second cross beams 4, 5 have stress strength which is basically consistent in all directions, with reliable strength.

In some embodiments, the first cross beam, the second cross beam as well as the first and second horizontal tube sections 111, 211 are provided with mounting holes configured to mount a battery compartment assembly of the mobility scooter.

In at least one embodiment, welding nuts are welded on the first and second horizontal tube sections 111, 211 as well as the first cross beam 4, the mounting holes are configured as threaded holes in the welding nuts, and the mounting holes in the second cross beam 5 are configured as unthreaded holes. A rear end cover in the battery compartment assembly is coupled to the first cross beam 4 through the mounting holes in the first cross beam 4, a battery compartment in the battery compartment assembly is coupled to the first and second longitudinal beams 1, 2 through the mounting holes in the first and second horizontal tube sections 111, 211, and a front end cover in the battery compartment assembly is coupled to the second cross beam through the mounting holes in the second cross beam.

In some embodiments, the first front tube section 11 has a front end welded to the outer side wall of the head tube 3, the second front tube section 21 has a front end welded to the outer side wall of the head tube 3, and the first and second front tube sections 11, 21 are symmetrically arranged relative to a vertical plane where an axis of the head tube 3 is located.

As illustrated in FIG. 1, the head tube 3 is formed by a profile machining process, and has a cylindrical outer side wall. The front ends of the first and second front tube sections 11, 21 are both coupled to the outer side wall of the head tube 3 with a carbon-dioxide arc welding operation, such that the first and second longitudinal beams 1, 2 are conveniently coupled to the head tube 3, and a junction thereof has high strength.

In some embodiments, the first and second front tube sections 11, 21 are each a round tube, and the first and second rear tube sections 12, 22 may each have a plate-like structures formed by pressing a round tube. Thus, the first and second front tube sections 11, 21 have basically consistent stress strength in all directions, with reliable strength.

Or, the first and second front tube sections 11, 21 may each be a square or rectangular tube.

Figure 2:
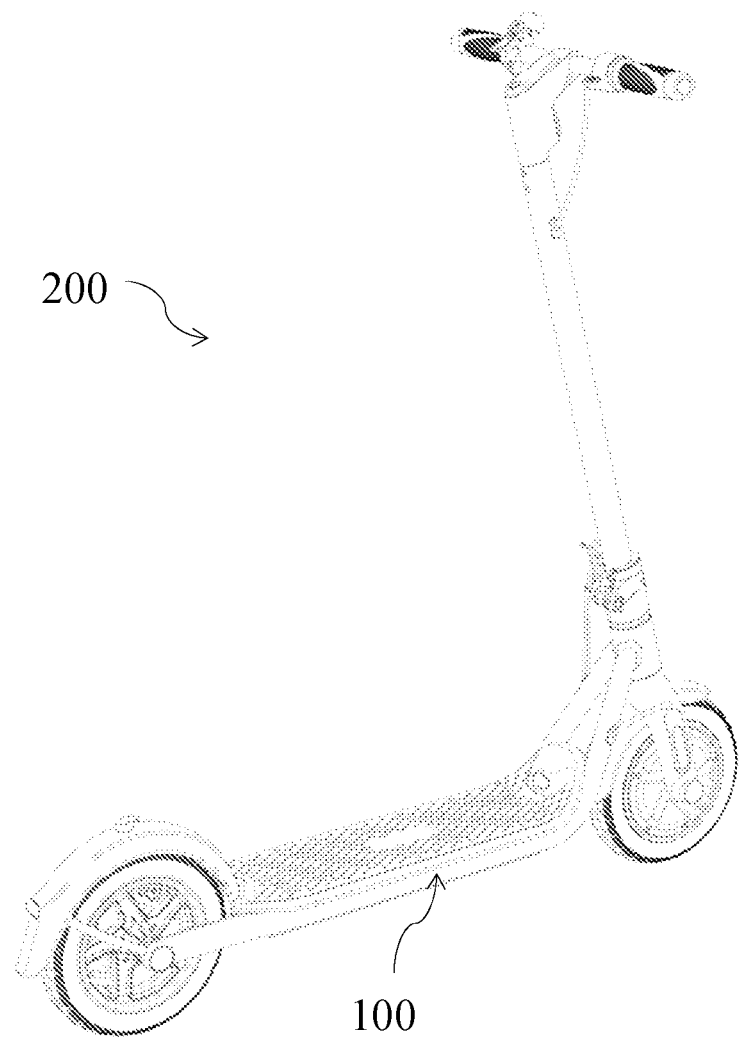
FIG. 2 is a schematic diagram of a mobility scooter according to an embodiment of the present disclosure.

As illustrate in FIG. 2, a mobility scooter 200 according to embodiments of a second aspect of the present disclosure includes a frame 100 according to any of the above-mentioned embodiments.

The mobility scooter 200 according to the embodiments of the present disclosure has the same technical advantages as the frame 100 according to the above-mentioned embodiments, which are not repeated herein.

In some embodiments, the mobility scooter 200 may be configured as an electric scooter.

In the description of the present disclosure, it is to be understood that terms such as "center", "longitudinal", "transverse", "length", "width", "thickness", "upper", "lower", "front", "rear", "left", "right", "vertical", "horizontal", "top", "bottom", "inner", "outer", "clockwise", "anti-clockwise", "axial", "radial", and "circumferential" should be construed to refer to the orientation as illustrated in the drawings. These relative terms are for convenience of description and do not require that the present disclosure be constructed or operated in a particular orientation, thus cannot be construed to limit the present disclosure.

In addition, the terms such as "first" and "second" are used herein for purposes of description and are not intended to indicate or imply relative importance or significance or to imply the number of indicated technical features. Thus, the feature defined with "first" and "second" may include at least one of this feature explicitly or implicitly. In the description of the present disclosure, "a plurality of" means at least two, for example, two, three, or the like, unless specifically limited otherwise.

In the present disclosure, unless specified or limited otherwise, the terms "mounted", "coupled", "coupled", and "fixed" and the like are used broadly, and may be, for example, fixed connections, detachable connections, or integral connections; may also be mechanical or electrical connections or communication with each other; may also be direct connections or indirect connections via intervening structures; may also be communication or an interaction relationship of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms "an embodiment", "some embodiments", "example", "specific example" or "some examples" means that a particular feature, structure, material, or characteristic described in connection with the embodiment or example is included in at least one embodiment or example of the present disclosure. In the specification, the schematic expressions to the above-mentioned terms are not necessarily referring to the same embodiment or example. Furthermore, the described particular features, structures, materials, or characteristics may be combined in any suitable manner in one or more embodiments or examples. Furthermore, those skilled in the art may combine different embodiments or examples and features in different embodiments or examples described in the specification, without mutual contradictions.

Although embodiments of the present disclosure have been shown and illustrated, it shall be understood that the above-mentioned embodiments are exemplary and not construed as limitations to the present disclosure. Various changes, modifications, alternatives and variants within the scope of the present disclosure may be made by those skilled in the art.

What is claimed is:

1. A frame, comprising:
a first longitudinal beam and a second longitudinal beam;
a head tube, a first end of the first longitudinal beam and a first end of the second longitudinal beam being both coupled to the head tube; and
a first cross beam having a first end coupled to the first longitudinal beam and a second end coupled to the second longitudinal beam, wherein the first longitudinal beam is divided into a first front tube section and a first rear tube section by the first cross beam, the second longitudinal beam is divided into a second front tube section and a second rear tube section by the first cross beam, and the first and second rear tube sections form a rear fork of a mobility scooter;
wherein the first and second longitudinal beams are each a bent tube;
wherein the first front tube section has a front end welded to an outer side wall of the head tube, the second front tube section has a front end welded to the outer side wall of the head tube, and the first and second front tube sections are symmetrically arranged relative to a plane where an axis of the head tube is located.

2. The frame according to claim 1, wherein the first and second longitudinal beams are each formed by bending a standard tube.

3. The frame according to claim 1, wherein the first front tube section comprises a first horizontal tube section, a first bent tube section and a first inclined tube section arranged sequentially, the second front tube section comprises a second horizontal tube section, a second bent tube section and a second inclined tube section arranged sequentially, the first and second horizontal tube sections are parallel to each other, and the first and second inclined tube sections form an angle and are both coupled to the head tube.

4. The frame according to claim 3, wherein the first and second horizontal tube sections as well as the first and second inclined tube sections are each a straight tube.

5. The frame according to claim 4, wherein the first and second horizontal tube sections both extend in a front-rear direction, the first inclined tube section extends upwards to a front left relative to the first horizontal tube section, and the second inclined tube section extends upwards to a front right relative to the second horizontal tube section.

6. The frame according to claim 5, wherein an upper end of the first inclined tube section and an upper end of the second inclined tube section are close to each other in a left-right direction and are fixedly welded to an outer side wall of the head tube.

7. The frame according to claim 3, wherein the frame further comprises a second cross beam, and the second cross beam couples the first and second inclined tube sections.

8. The frame according to claim 7, wherein the first cross beam has a first end welded to an inner side of the first longitudinal beam and a second end welded to an inner side of the second longitudinal beam.

9. The frame according to claim 8, wherein the first and second cross beams are coupled to the first and second longitudinal beams with a carbon-dioxide arc welding operation.

10. The frame according to claim 7, wherein on a projection plane perpendicular to a left-right direction, projections of the first and second cross beams coincide with a projection of the first longitudinal beam, and the first and second beams extend substantially in the left-right direction.

11. The frame according to claim 7, wherein the first and second cross beams are each a round tube.

12. The frame according to claim 1, wherein the front ends of the first and second front tube sections are both coupled to the outer side wall of the head tube with a carbon-dioxide arc welding operation.

13. The frame according to claim 1, wherein the first and second rear tube sections forming the rear fork in the frame are integrally formed with the first and second front tube sections respectively.

14. The frame according to claim 1, wherein the first and second rear tube sections is each have a plate-like structures formed by pressing a round tube.

15. A frame, comprising:
a first longitudinal beam and a second longitudinal beam;
a head tube, a first end of the first longitudinal beam and a first end of the second longitudinal beam being both coupled to the head tube; and
a first cross beam having a first end coupled to the first longitudinal beam and a second end coupled to the second longitudinal beam, wherein the first longitudinal beam is divided into a first front tube section and a first rear tube section by the first cross beam, the second longitudinal beam is divided into a second front tube section and a second rear tube section by the first cross beam, and the first and second rear tube sections form a rear fork of a mobility scooter;
wherein the first and second longitudinal beams are each a bent tube;
wherein the first front tube section comprises a first horizontal tube section, a first bent tube section and a first inclined tube section arranged sequentially, the second front tube section comprises a second horizontal tube section, a second bent tube section and a second inclined tube section arranged sequentially, the first and second horizontal tube sections are parallel to each other, and the first and second inclined tube sections form an angle and are both coupled to the head tube;
wherein the frame further comprises a second cross beam, and the second cross beam couples the first and second inclined tube sections;
wherein the first cross beam, the second cross beam as well as the first and second horizontal tube sections are provided with mounting holes configured to mount a battery compartment assembly of the mobility scooter.

16. The frame according to claim 15, wherein the mounting holes in first and second horizontal tube sections as well as the first cross beam are configured as threaded holes in welding nuts welded on the first and second horizontal tube sections as well as the first cross beam, and the mounting hole in the second cross beam is configured as an unthreaded hole.

17. The frame according to claim 15, wherein the first and second front tube sections are each a round tube; or the first and second front tube sections are each a square or rectangular tube.

18. A mobility scooter, comprising:
a frame comprising:
  a first longitudinal beam and a second longitudinal beam;
  a head tube, a first end of the first longitudinal beam and a first end of the second longitudinal beams being both coupled to the head tube; and
  a first cross beam having a first end coupled to the first longitudinal beam and a second end coupled to the second longitudinal beam, wherein the first longitudinal beam is divided into a first front tube section and a first rear tube section by the first cross beam, the second longitudinal beam is divided into a second front tube section and a second rear tube section by the first cross beam, and the first and second rear tube sections form a rear fork of a mobility scooter; and
a rear wheel mounted to the frame through the first and the second rear tube sections,
wherein the first and second longitudinal beams are each a bent tube;
wherein the first front tube section comprises a first horizontal tube section, a first bent tube section and a first inclined tube section arranged sequentially, the second front tube section comprises a second horizontal tube section, a second bent tube section and a second inclined tube section arrange sequentially, the first and second horizontal tube sections are parallel to each other, and the first and second inclined tube sections form an angle and are both coupled to the head tube;
wherein the frame further comprises a second cross beam, and the second cross beam couples the first and second inclined tube sections;
wherein the first cross beam, the second cross beam as well as the first and second horizontal tube sections are provided with mounting holes configured to mount a battery compartment assembly of the mobility scooter.

\* \* \* \* \*